United States Patent

[11] 3,609,504

| [72] | Inventors | John S. N. Barker;<br>Ronald H. Minter, both of Northam, England |
|---|---|---|
| [21] | Appl. No. | 872,018 |
| [22] | Filed | Oct. 29, 1969 |
| [45] | Patented | Sept. 28, 1971 |
| [73] | Assignee | Bardic Systems Limited<br>Northam, Southampton, England |
| [32] | Priority | Oct. 31, 1968 |
| [33] | | Great Britain |
| [31] | | 51,758/68 |

[54] APPARATUS FOR DISCONNECTING AN AUXILIARY BATTERY FROM A MAIN BATTERY DURING DISCHARGE OF THE MAIN BATTERY
3 Claims, 1 Drawing Fig.

[52] U.S. Cl. ..................................... 320/7,
307/66, 307/141, 317/22, 320/51
[51] Int. Cl. ........................................ H02j 7/00
[50] Field of Search ........................... 320/6, 15,
52, 57, 59, 17, 39, 40, 7, 11, 13, 14, 19; 307/48,
66, 127, 131, 141.4, 132; 317/22

[56] References Cited
UNITED STATES PATENTS

| 3,043,989 | 7/1962 | Nash et al. | 317/22 |
| 3,051,887 | 8/1962 | Lind | 307/127 |
| 3,090,871 | 5/1963 | Gorman | 320/15 |
| 3,242,411 | 3/1966 | Lilienfeld | 320/40 |
| 3,221,630 | 9/1966 | Miyazawa | 317/22 |
| 3,341,762 | 9/1967 | Rockoff | 320/25 |
| 3,426,264 | 2/1969 | Frysztak | 320/TD (UX) |
| 3,457,491 | 7/1969 | Black et al. | 320/61 |
| 3,477,009 | 11/1969 | Nichols | 320/39 |
| 2,309,054 | 1/1943 | Fell | 320/15 |

Primary Examiner—J. D. Miller
Assistant Examiner—John M. Gunther
Attorney—Watson, Cole, Grindle & Watson ABSTRACT: In an arrangement for charging an auxiliary battery in a caravan from the charging system of a main battery driven by an internal combustion engine in a motor car, without allowing it to be discharged by the self-starter, the two batteries are connected in parallel through an overcurrent relay which disconnects the auxiliary battery if its discharge current exceeds a predetermined value. The batteries are reconnected after a period by a delayed resetting means, so that if the starter is still taking a heavy current the relay will alternately close for a short period and open for a much longer period thereby preventing discharge of the auxiliary battery.

PATENTED SEP 28 1971
3,609,504
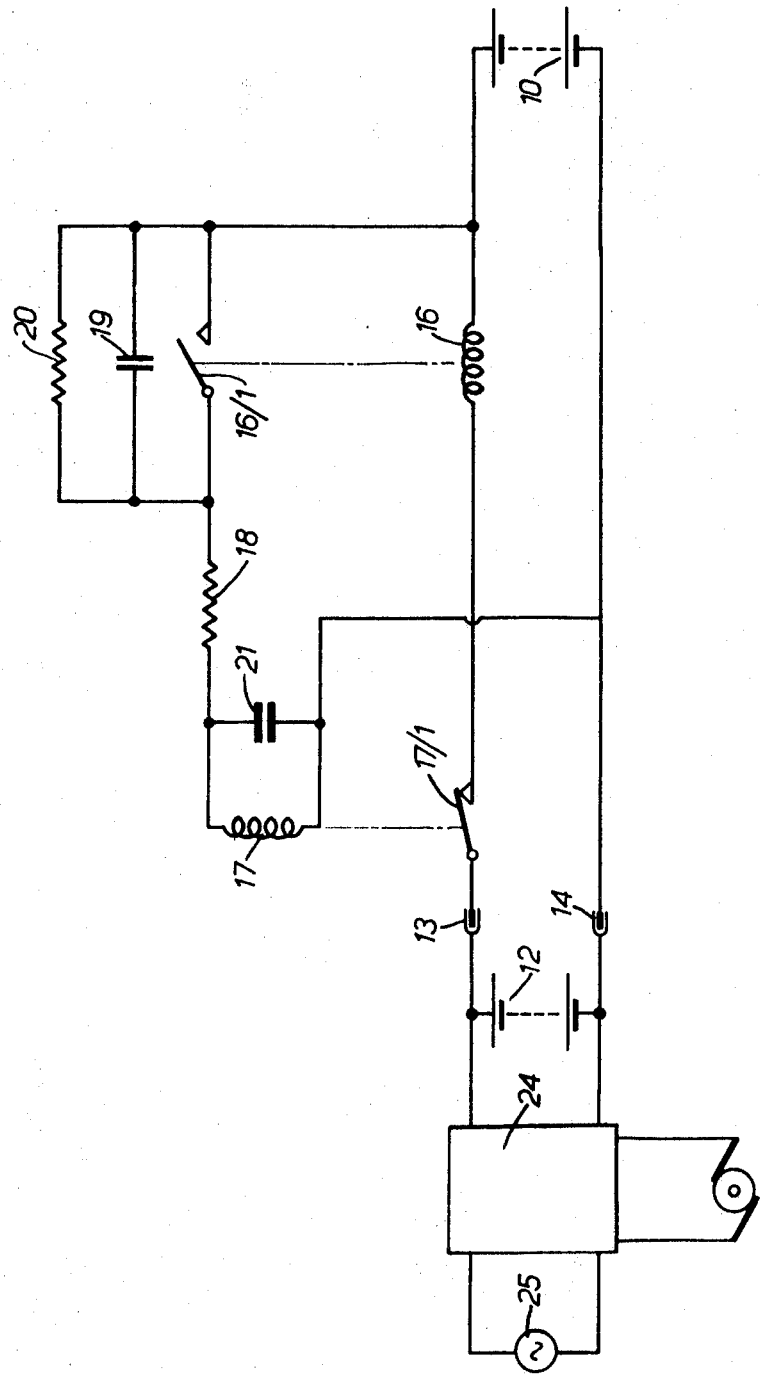
INVENTORS
JOHN SCOTT NETHERWOOD BARKER
RONALD HENRY MINTER
BY
Watson, Cole, Grindle & Watson
ATTORNEY

APPARATUS FOR DISCONNECTING AN AUXILIARY BATTERY FROM A MAIN BATTERY DURING DISCHARGE OF THE MAIN BATTERY

This invention relates to electric battery-charging apparatus and is concerned with such apparatus for charging an auxiliary battery from a charging system of a main battery, driven by an internal combustion engine. The invention is particularly, though not exclusively, concerned with batteries installed in caravans arranged to be towed by motor cars, and charged by the car battery charging system.

According to the present invention battery-charging apparatus for charging an auxiliary battery from a charging system of a main battery, driven by an internal combustion engine, includes means for connecting the two batteries in parallel through overcurrent relay means for disconnecting the auxiliary battery of its discharge current exceeds a predetermined value.

Preferably the overcurrent relay means includes delayed resetting means for reconnecting the batteries when they have been disconnected for a period.

Thus in one form of the invention the relay means include a current relay having a current winding in the circuit connecting the batteries which circuit also includes normally closed contacts of a delayed resetting relay having a winding connected, in series with a normally open contact of the current relay, across one of the batteries, and provided with means for delaying its release.

The apparatus may also include a rectifier unit (normally including a transformer) for charging one or each battery from an external AC supply.

The invention may be put into practice in various ways but one specific embodiment will be briefly described by way of example with reference to the accompanying drawing which is a circuit diagram of a battery-charging system.

In this embodiment the invention is applied to a battery pack for use in a trailer caravan intended to be toward by a motor car.

Normally the caravan would be connected to the car battery by a standard connector providing supplies to rear lamps, stop lights and possibly an unswitched supply, from the motor-car battery. No difficulty should be experienced in supplying the lamps and other loads that are only required while the car is running, but in addition it may be desirable to supply caravan lighting, either fluorescent or tungsten lamps, low voltage electric razors, clocks, heaters, or other auxiliary loads that require power while the car is not running, or indeed while it is disconnected from the caravan.

For this purpose it has been proposed to provide an auxiliary battery in the caravan itself, but some difficulty may arise in providing a simple system for charging this satisfactorily. If the two batteries are simply connected in parallel the current drawn from the auxiliary battery by the self-starter will tend to be of the same order as that drawn from the car battery, and this will overload the conductors normally used for connecting the two together unless this is of exceptionally heavy gauge. To prevent this it has been proposed to connect a diode in series with the auxiliary battery but since the forward voltage drop of any diode is likely to be of the order of at least half a volt, this will restrict charging of the auxiliary battery. Thus the voltage of the car battery must exceed that of the auxiliary battery by at least half a volt before the auxiliary battery will receive any charge, and hence the car battery will reach a fully charged condition and cause the regulator to cut down the charging current when the auxiliary battery is still far from fully charged.

This difficulty is overcome in accordance with the present invention by connecting the batteries together in parallel through overcurrent relay means which offers negligible resistance to the passage of current from one to the other under normal working conditions, but disconnects them if the current exceeds a certain predetermined value.

Thus the auxiliary battery 10 is connected to terminals 13 and 14, which will be referred to as car battery terminals, which may in fact be incorporated in a socket to receive a plug connected to the car, through a current winding 16 of a current relay, conveniently of reed type, and a normally closed contact 17/1 of a delayed resetting relay. The winding 17 of the delayed resetting relay is connected across the terminals of the auxiliary battery through a small resistor 18 (e.g. 18 ohms) and a normally open contact 16/1 of the reed current relay. The winding 17 of the delayed resetting relay is shunted by a substantial capacitor 21 (e.g. 640 microfarads) and the contact of the current relay is shunted by a small capacitor 19 (e.g. 0.1 microfarad) in parallel with a resistor 20 (e.g. 330 ohms).

Thus, in operation, under normal conditions the reed relay winding 16 (which may consist of five turns of 18 s.w.g. copper wire) offers negligible resistance to the passage of current between one battery and the other so that the majority of the charging current will flow from the generator 27 to whichever battery is more discharged, and both batteries should reach a substantially fully charged condition before the regulator in the car will substantially cut down the charging current. Thus if the auxiliary battery 10 has been considerably discharged by a substantial period of static use it will receive the bulk of the charging current and the car generator will continue to supply a high charging current until both batteries are substantially fully charged.

When the self-starter is operated, particularly if the engine is cold or fails to start easily, it will not only draw a heavy current from the car battery 12, of which the voltage may fall to perhaps 9½ or 10 volts, but also will tend to draw a heavy current from the auxiliary battery. If this were allowed to occur it would be liable to burn out the wiring as well as discharge the auxiliary battery.

The reed relay winding 16 will, however, close the reed contact 16/1 at any current exceeding say 8 amperes, thereby energizing the 12-volt delayed resetting relay 17 to open its normally closed contact 17/1 and disconnect the auxiliary battery 10 from the car battery terminals 13 and 14. The small series resistor 20 and the small capacitor 19 shunting the reed relay contact protect the letter against a current surge due to the inductive load.

Opening of the contact 17/1 of the delayed resetting relay also cuts off the current through the reed relay winding 16, the contact 16/1 of which promptly opens. The current through the delayed resetting relay 17 is, however, maintained from the large capacitor 21 in parallel with it, supplemented by current through the resistor 20 shunting the reed contact 16/1. Accordingly an appreciable period, conveniently between half a second and 10 seconds elapses before the delayed resetting relay 17 recloses its normally closed contact 17/1 and restores the connection between the two batteries. If the overload current drawn by the starter is prolonged, the operation will be repeated at a rate determined by the values of the components.

Thus the relays oscillate slowly, the closed time being extremely short, contact, that, for example, with a potential discharge current of 50 amperes from the auxiliary battery due to the car starter, the average current drain might be less than 1 ampere. Thus the auxiliary battery is not called upon to bear its share of the starter load, in addition to the static load, and the relatively light conductors connecting the two batteries together will not be overloaded.

In addition the terminals 13 and 14 of the car battery 12 are connected to the output of a rectifier unit 24 incorporating a transformer for connection to an alternating external supply 25. The transformer conveniently has input terminals for supplies at two or more different voltages. Thus when an external supply is available it may be employed to provide a steady current, say of 3 amperes, which will supply the static load or part of it when required, and otherwise will be used to charge both the auxiliary battery and the car battery if still connected.

What we claim as our invention and desire to secure by Letters Patent is:

1. Apparatus for charging an auxiliary battery from a charging system driven by an internal combustion engine for a main battery, comprising;
   a first relay having a normally closed contact and a relay winding,
   a second relay having a normally open contact and a relay winding,
   the winding of said second relay serially connected to said normally closed contact and the series combination interconnecting said main and auxiliary batteries,
   said normally open contact connected to the winding of said first relay, and
   said first relay including means for delaying the resetting of its contact,
   whereby said auxiliary battery is disconnected from said main battery during current demands which exceed a predetermined threshold amperage thereby opening said normally closed contact for a period determined by said means for delaying.

2. Apparatus as in claim 1 wherein said means for delaying comprises a capacitor parallelly connected to the winding of said first relay and a resistor interconnected between said capacitor and said normally open contact.

3. Apparatus as in claim 1 further comprising means for rectifying the output of an AC source for charging each battery.